US006377300B1

(12) United States Patent
Morris et al.

(10) Patent No.: US 6,377,300 B1
(45) Date of Patent: Apr. 23, 2002

(54) COMPACT FLAT-FIELD CALIBRATION APPARATUS

(75) Inventors: Martin Jesse Morris, Peoria County, IL (US); Joseph Charles Kroutil, St. Louis, MO (US)

(73) Assignee: McDonnell Douglas Corporation, St. Louis, MO (US)

( * ) Notice: Subject to any disclaimer, the term of this patent is extended or adjusted under 35 U.S.C. 154(b) by 0 days.

(21) Appl. No.: 09/060,097

(22) Filed: Apr. 14, 1998

(51) Int. Cl.[7] .............................................. H04N 5/225
(52) U.S. Cl. ..................... 348/207; 348/187; 250/252.1
(58) Field of Search .............................. 348/207, 229, 348/230, 254, 255, 335, 340, 341, 342, 360, 370, 674, 675, 187, 188, 189, 180; 358/518, 519, 298; 250/559.1, 559.4, 559.45, 483.1, 484.2, 252.1

(56) References Cited

U.S. PATENT DOCUMENTS 5,148,288 A * 9/1992 Hannah ...................... 358/298

FOREIGN PATENT DOCUMENTS

JP         411041628   *  2/1999   .......... H04N/17/04

* cited by examiner

*Primary Examiner*—Tuan Ho
(74) *Attorney, Agent, or Firm*—Alston & Bird LLP

(57) ABSTRACT

A portable apparatus for uniformly illuminating a detector that includes an array of charge-coupled devices (CCDs) is provided for facilitating calibration of the respective gains of the CCDs. The illumination apparatus includes a housing, such as a cup-shaped housing, which defines an internal cavity and which opens through a first end. The illumination apparatus also includes a light source, such as a photoluminescent sheet, that is disposed within the internal cavity for uniformly illuminating the plurality of CCDs to thereby permit the CCDs to be calibrated. The illumination apparatus is also adapted to be mounted to the detector, such as by means of a mounting ring, in much the same fashion that a camera lens is attached to a camera. As such, the illumination apparatus can be readily mounted to a detector, such as a CCD camera, such that the array of CCDs can be calibrated in an efficient manner in the field, i.e., without requiring the detector to be transported to a laboratory for calibration.

16 Claims, 3 Drawing Sheets

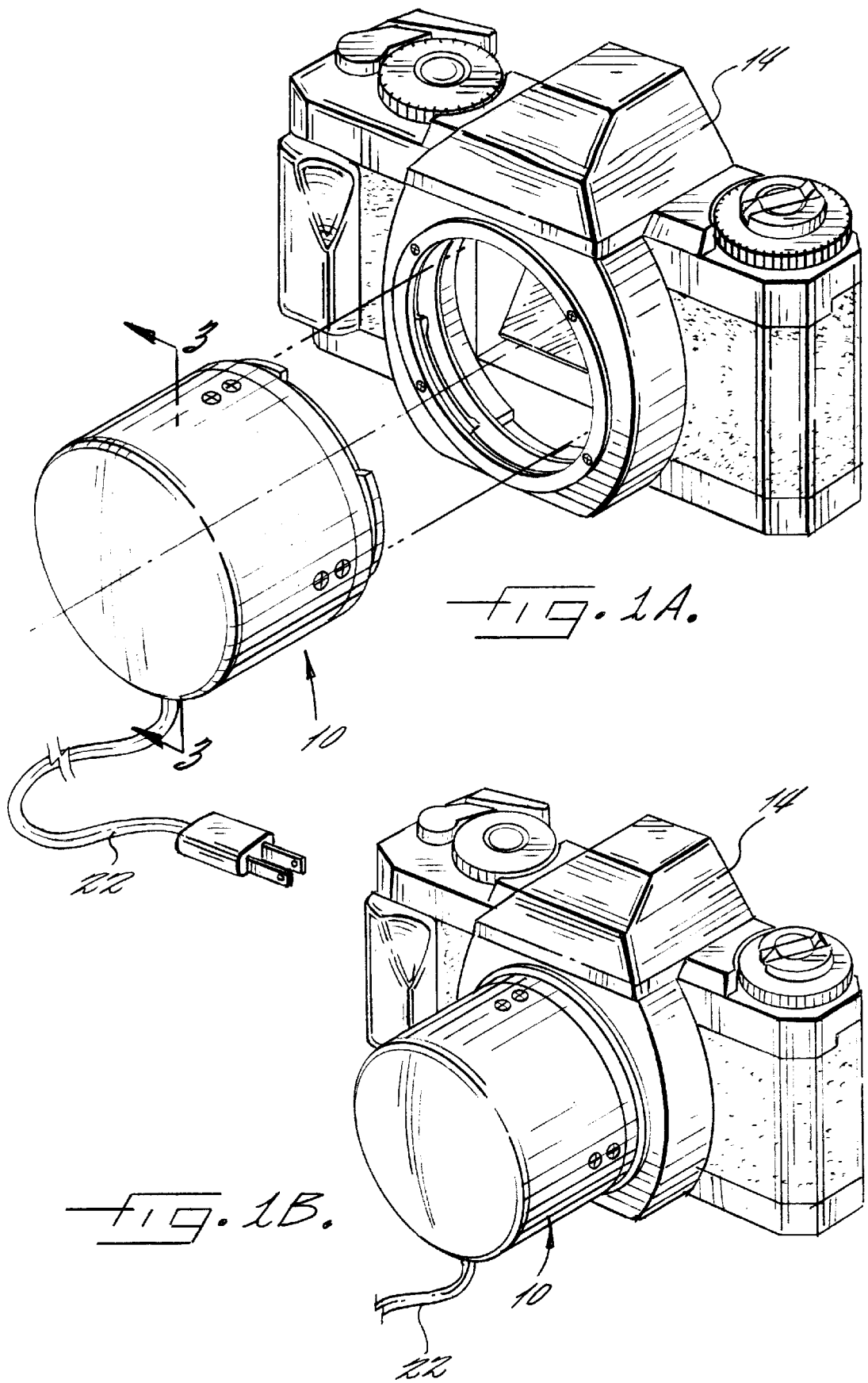

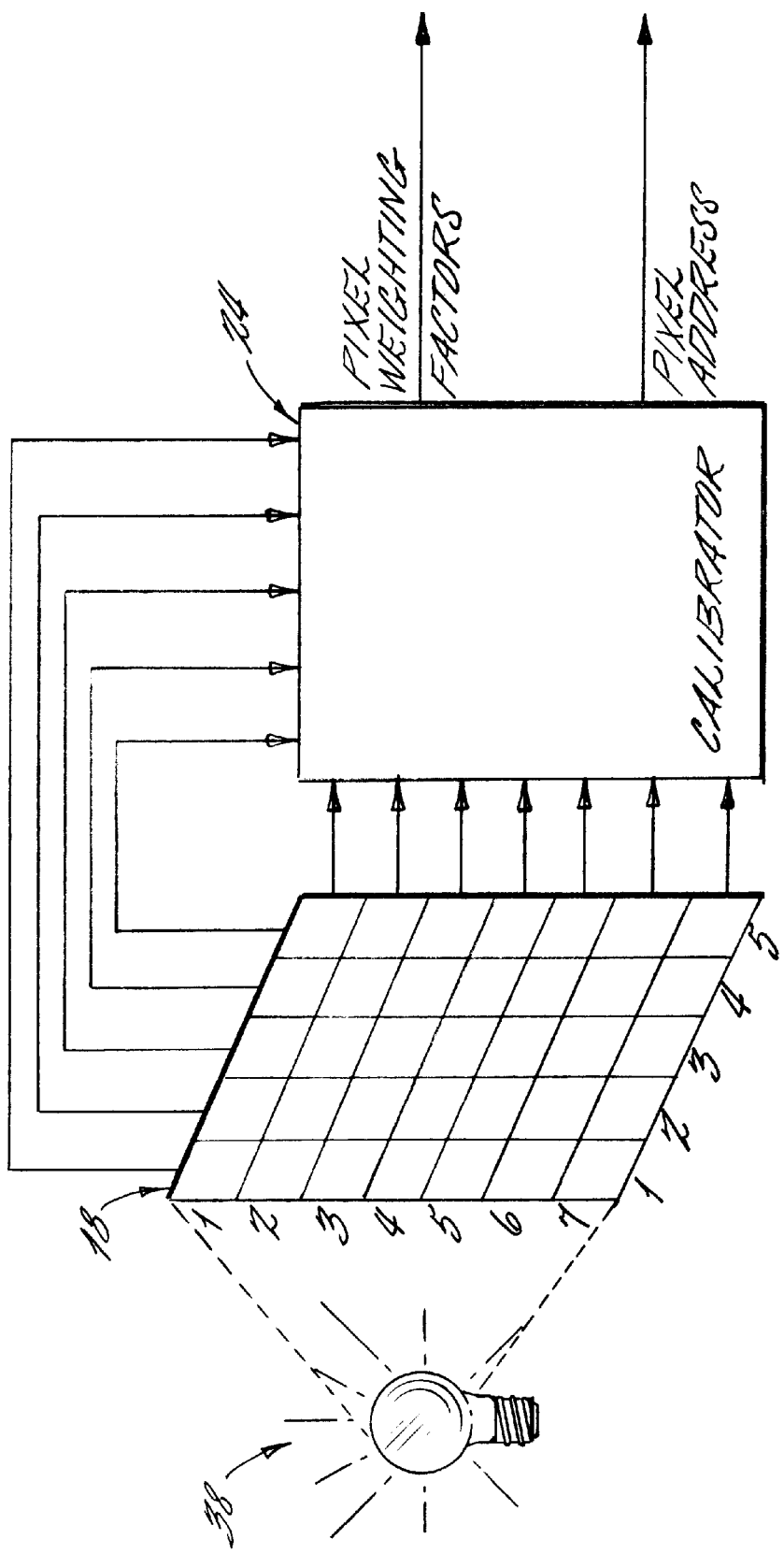

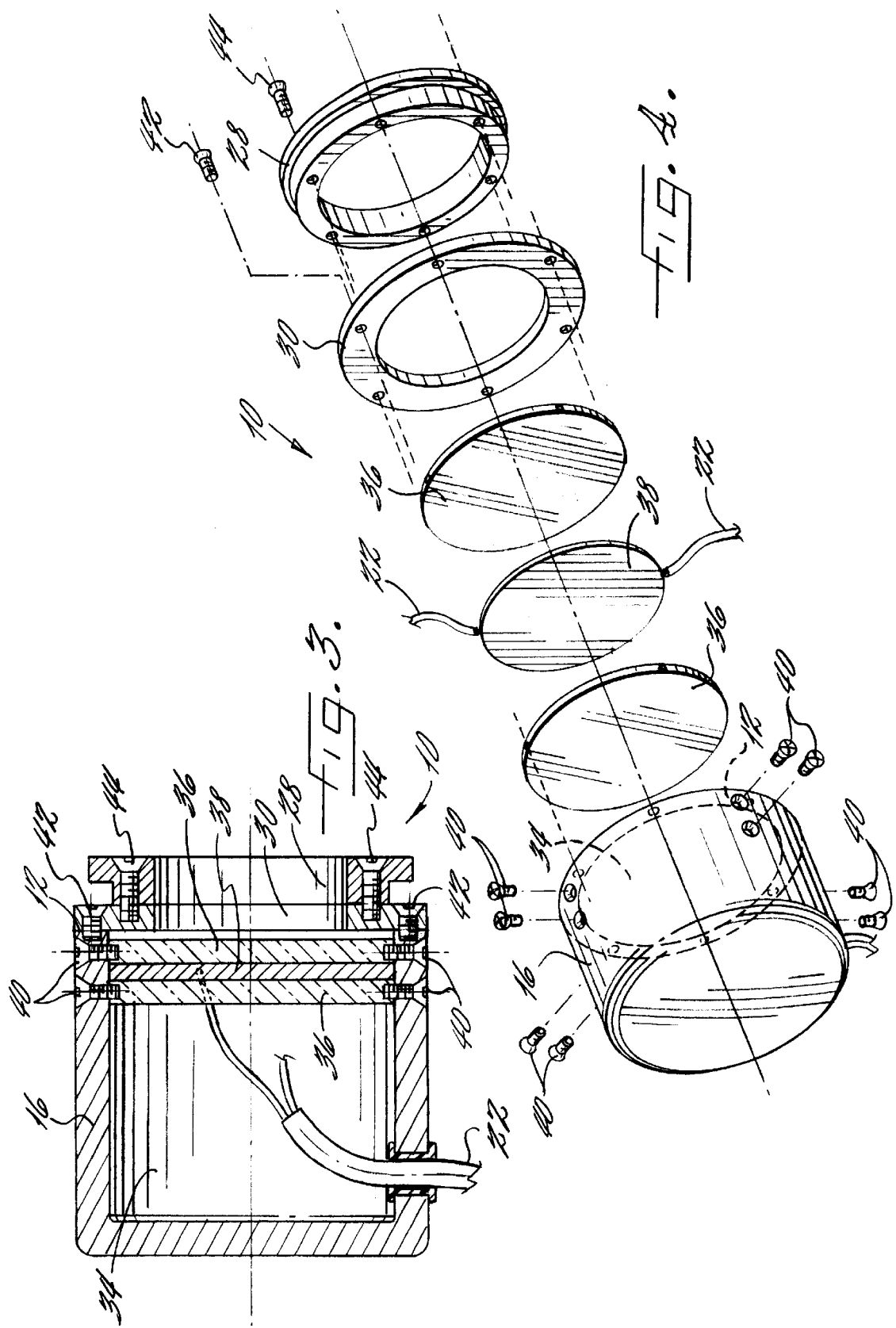

COMPACT FLAT-FIELD CALIBRATION APPARATUS

FIELD OF THE INVENTION

The present invention relates generally to methods and apparatus for calibrating an array of charge-coupled devices and, more particularly, to methods and apparatus for uniformly illuminating an array of charge-coupled devices during a calibration process.

BACKGROUND OF THE INVENTION

Many conventional detectors include an array of charge-coupled devices (CCDs) for obtaining precise optical measurements. For example, CCD cameras include an array of CCDs. CCDs are utilized by detectors since the CCDs are capable of measuring light intensity with a very high level of sensitivity over a large dynamic range. In this regard, CCD cameras can measure light intensity with much greater sensitivity than film. In addition, the output provided by a CCD camera can be readily digitized for subsequent processing by a computer or other digital processor.

Due to the sensitivity of the CCDs, detectors that include an array of CCDs are generally utilized in applications that demand high levels of precision and accuracy. One application that demands high levels of precision and accuracy relates to pressure mapping during wind tunnel tests of objects, such as model aircraft, that are coated with pressure-sensitive paint. In this regard, in order to measure the pressures to which an aircraft is subjected during flight, a scaled model aircraft coated with pressure sensitive paint can be placed in a wind tunnel as described by U.S. Pat. No. 5,359,887 to Scott D. Schwab, et al. When exposed to fluorescent lighting, the paint on the model aircraft emits light having an intensity that corresponds to the air pressure to which that portion of the aircraft is subjected. In order to record and measure the intensity of the light emitted by the pressure sensitive paint, a detector, such as a CCD camera, can obtain an image of the model aircraft. These images can thereafter be digitized and analyzed to determine the relative air pressures to which the various portions of the aircraft are subjected.

During this experiment, a CCD detector is utilized to precisely measure variations in light intensity due to the sensitivity of the CCDs. In order to obtain meaningful measurements, however, the array of CCDs must be calibrated so that each individual CCD responds in the same manner, i.e., there should not be any pixel-to-pixel variation in the gain.

Current calibration techniques employ a process called flat field correction. During this process, the array of CCDs is exposed to light having a uniform intensity and the outputs of the CCDs are adjusted such that the adjusted output of each CCD is identical, thereby normalizing any pixel-to-pixel variation in the gain provided by the array of CCDs. Conventionally, this calibration process is performed by mounting the detector containing the array of CCDs to an integration sphere that uniform illuminates the CCDs. Since the integration sphere is generally mounted to an optical bench, the detector must be transported to the optical bench, mounted to the integration sphere and calibrated.

Unfortunately, it has been found that detectors that include arrays of CCDs are not calibrated as often as is desired. While a number of factors contribute to this problem, it is believed that the relative immobility of the optical bench and, in turn, the integration sphere is a primary factor. In this regard, since the optical bench typically resides in a laboratory, a detector that includes an array of CCDs must generally be removed from service and taken from the field to the laboratory in order to calibrate the CCDs. Since the users of the detectors apparently do not wish to expend the additional time and effort required to transport the detector to and from the laboratory, many detectors that include arrays of CCDs are rarely calibrated, thereby reducing the reliability and, in some instances, the quality of the optical measurements obtained by the detectors.

SUMMARY OF THE INVENTION

It is therefore an object of the present invention to provide a calibration apparatus that reduces the time and effort needed to calibrate detectors that include arrays of charge-coupled devices.

It is another object of the present invention to provide a portable calibration device.

These and other objects are provided, according to the present invention, by a portable apparatus for uniformly illuminating a detector comprised of a plurality of CCDs during calibration of the respective gains of the CCDs. The illumination apparatus includes a housing, such as a cup-shaped housing, which defines an internal cavity and which opens through a first end. The illumination apparatus also includes a light source and, more preferably, a photoluminescent sheet that is disposed within the internal cavity for uniformly illuminating the plurality of CCDs to thereby permit the CCDs to be calibrated.

The housing is preferably sized such that the illumination apparatus is portable. In addition, the housing is adapted to be mounted to the detector, such as a CCD camera. For example, the portable illumination apparatus can also include a mounting ring, operably connected to the first end of the housing, for mounting the housing to the detector. As such, the illumination apparatus can be readily mounted to a detector, such as a CCD camera, such that the array of CCDs can be calibrated in an efficient manner in the field, i.e., without requiring the detector to be transported to a laboratory for calibration.

In one preferred embodiment in which the light source is a photoluminescent sheet, the photoluminescent sheet is preferably placed between a pair of support sheets. Advantageously, the support sheet that is disposed on the side of photoluminescent sheet that faces the first end of the housing is formed of a material, such as plexiglass, that is at least partially transparent and uniformly diffuse. As such, light emitted by the photoluminescent sheet can pass through the support sheet and uniformly illuminate the plurality of CCDs during the calibration process.

Therefore, the illumination apparatus of the present invention simplifies the process of calibrating a detector that includes an array of CCDs while continuing to provide accurate calibration. In particular, the illumination apparatus is compact and, therefore, portable such that the illumination apparatus can be carried with the detector so as to calibrate the detector in the field. In addition, the illumination apparatus can be easily mounted to the detector in much the same fashion that a camera lens is mounted to a camera, thereby further simplifying the calibration process. Since the illumination apparatus of the present invention simplifies the calibration process and permits calibration to be performed on demand in the field, it is believed that detectors will be calibrated more frequently, thereby improving the quality and reliability of the images captured by the detectors.

BRIEF DESCRIPTION OF THE DRAWINGS

FIG. 1A is a perspective view of one embodiment the illumination apparatus of the present invention prior to mounting the illumination apparatus to a detector, such as a CCD camera, that includes an array of CCDs.

FIG. 1B is a perspective view of the illumination apparatus of FIG. 1A following mounting of the illumination apparatus to the detector.

FIG. 2 is a schematic representation of the calibration technique facilitated by the illumination apparatus of the present invention.

FIG. 3 is an assembled cross-sectional view of a illumination apparatus taken along line 3—3 of FIG. 1.

FIG. 4 is an exploded side view of the embodiment of the illumination apparatus of FIG. 3.

DETAILED DESCRIPTION OF THE DRAWINGS

The present invention will now be described more fully hereinafter with reference to the accompanying drawings, in which a preferred embodiment of the invention is shown. This invention may, however, be embodied in many different forms and should not be limited to the embodiments set forth herein; rather, this embodiment is provided so that this disclosure will be thorough and complete and will fully convey the scope of the invention to those skilled in the art. Like numbers refer to like elements throughout.

Referring now to FIG. 1A, an illumination apparatus 10 of one embodiment is shown prior to attachment to a detector 14, such as a CCD camera, containing an array of CCDs 18. The illumination apparatus includes a housing 16 defining an internal cavity 34 that opens through a first end 12 of the housing. As shown in FIGS. 1A and 1B, the first end of the illumination apparatus can be attached or mounted to the detector such that the internal cavity opens toward the detector.

The illumination apparatus 10 also includes a light source 38 disposed within the internal cavity 34 defined by the housing 16 for uniformly illuminating the array of CCDs 18 following mounting of the illumination apparatus to the detector 14 as shown in FIG. 1B. Based upon this uniform illumination, the gain of the individual CCDs of the detector can be calibrated or normalized such that the resulting images or data obtained by the detector will be of higher quality and improved reliability.

In this regard, FIG. 2 is a schematic representation of one technique for calibrating an array of CCDs 18. As known to those skilled in the art, CCDs that are subjected to light having a uniform intensity should provide outputs of equal magnitude. Unfortunately, CCDs oftentimes are slightly miscalibrated so as to produce different outputs upon exposure to light having a uniform intensity.

According to the illustrated calibration technique in which each CCD 18 forms one pixel of an overall image, each CCD is uniformly illuminated by the illumination apparatus 10 and, more particularly, by the light source 38 of the illumination apparatus. The output of each CCD is provided to a central control unit or calibrator 20, such as a microprocessor, a computer or the like. The calibrator then determines a respective pixel weighting factor for each CCD, i.e., each pixel, such that the product of the output of each CCD and the respective pixel weighting factor yields the same value for each pixel. Accordingly, the calibrator preferably outputs the pixel addresses and the respective pixel weighting factors. During subsequent use of the detector 14, the output of each CCD is preferably multiplied by the respective pixel weighting factor such that the resulting data is calibrated, thereby normalizing the gain and eliminating pixel-to-pixel variations. Once the detector has been properly calibrated, the detector can measure light intensities very precisely.

In order to properly calibrate the array of CCDs 18, however, the CCD array must be uniformly illuminated. As such, the illumination apparatus 10 of the present invention has been specifically developed to be mounted to a detector 14 so as to uniformly illuminate the CCD array. As illustrated in FIGS. 3 and 4, the illumination apparatus of one advantageous embodiment includes a cup-shaped housing 16 that opens through a first end 12. While the housing can have other shapes without departing from the spirit and scope of the present invention, the housing is preferably sized to be sufficiently small such that the resulting illumination apparatus is compact and, therefore, portable. In addition, although the housing is generally made of polyvinylchloride (PVC), the housing can be formed of other materials without departing from the spirit and scope of the present invention.

As described above, the illumination apparatus 10 includes a light source 38 disposed within the internal cavity 34 defined by the housing 16. In one advantageous embodiment, the light source is a photoluminescent sheet, such as the photoluminescent sheets provided by Proto-kut. In this embodiment, the photoluminescent sheet can be one component of a photoluminescent sheet assembly that includes a photoluminescent sheet disposed between a pair of support sheets 36 such that the photoluminescent sheet is structurally supported thereby. Although the support sheets can be formed of a variety of materials, the support sheet that is closest to the first end 12 of the illumination apparatus is preferably at least partly transparent and uniformly diffuse so that light generated by the light source 38 is emitted through the first end of the housing. For example, the support sheets can be formed of plexiglass or the like. In addition, the support sheet that is furthest from the first end of the illumination apparatus can be formed of an at least partially reflective material, such as a polished metal, in order to direct a larger percentage of the light emitted by the photoluminescent sheet through the first end of the housing and onto the array of CCDs 18.

As illustrated, the photoluminescent sheet 38 requires electrical power that can be supplied, for example, via a power cord 22 that is designed to be plugged into a conventional electrical outlet. It is noted, however, that the illumination apparatus 10 may also be powered in a variety of other manners as known by those skilled in the art.

The photoluminescent sheet assembly is preferably mounted within the internal cavity 34 defined by the housing 16. For example, the photoluminescent sheet assembly can be mounted within the housing by means of set screws 40 that extend through the wall of the housing 16 as shown in FIGS. 3 and 4. However, the photoluminescent sheet assembly can be mounted within the housing by other means, such as adhesives, without departing from the spirit and scope of the present invention.

The illumination apparatus 10 also preferably includes means, adjacent the first end 12 of the housing 16, for mounting the housing to the detector 14. In one embodiment, mounting means includes a mounting ring 28 that is attached to the first end of the housing. Although the mounting ring can be directly attached to the first end of the housing, the illumination apparatus of the illustrated embodiment includes an annular transition element 30 disposed between the mounting ring and the first end of the housing. According to this embodiment, the annular transition ring can be attached to the first end of the housing, such as by threaded fasteners 42, adhesive or the like, and the mounting ring can be attached to the annular transition element, also by means of threaded fasteners 44, adhesive or the like. Although the mounting ring and the annular transition ring can be formed of a variety of materials without departing from the spirit and scope of the present invention, the mounting ring and annular transition ring of one embodiment are also formed of PVC or the like.

The mounting ring 28 can be designed to mount to the detector 14 in a variety of fashions without departing from the spirit and scope of the present invention. According to one advantageous embodiment in which the detector is a CCD camera, however, the mounting ring is designed to mount to the detector in the same fashion that a camera lens is typically mounted to a camera. In this regard, the mounting ring can be internally threaded so as to threadably engage the threaded portion of the detector to which lenses are typically attached. Accordingly, the illumination apparatus 10 can be quickly and easily mounted to the detector, thereby further facilitating calibration of the array of CCDs 18.

As shown in FIG. 3, the light source 38, such as the photoluminescent sheet, is preferably as large or larger than the opening through the first end 12 of housing 16 defined by the mounting ring 28. Accordingly, the light source will uniformly illuminate the array of CCDs 18 during the calibration process.

In use, the illumination apparatus 10 can be periodically mounted to a detector 14 in order to calibrate the CCD array 18 of the detector. Since the illumination apparatus preferably includes means, such as a mounting ring 28, for mounting the illumination apparatus to the detector, the illumination apparatus can be mounted to the detector in a simple and straightforward fashion in much the same manner in which a camera lens is mounted to a camera. Because of the compact design of the illumination apparatus, the illumination apparatus is portable. As such, the illumination apparatus can be readily transported to the detector in order to calibrate the detector in the field immediately prior to the use of the detector. As such, the detector need not be removed from the field and transported to a laboratory for calibration as required by conventional calibration techniques.

Since the illumination apparatus 10 of the present invention greatly simplifies the calibration process by providing a portable device that can be mounted to a detector 14 in the same fashion as a camera lens, it is believed that the illumination apparatus will permit detectors to be calibrated more regularly. As a result of this more regular calibration, the quality and reliability of the images and data collected by the detectors should therefore be enhanced.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed is:

1. An apparatus for illuminating a detector comprised of a plurality of charge coupled devices during calibration of the respective gains of the charge coupled devices, the illumination apparatus comprising:
    a housing defining an internal cavity and opening through a first end, said housing adapted to mount to the detector such that said housing opens toward the detector; and
    a photoluminescent sheet disposed within the internal cavity defined by said housing for illuminating the plurality of charge coupled devices to thereby permit the respective gains of the charge coupled devices to be calibrated.

2. An illumination apparatus according to claim 1 further comprising a photoluminescent sheet assembly comprising said photoluminescent sheet and a pair of support sheets disposed on opposite sides of said photoluminescent sheet, wherein said support sheet disposed on the side of said photoluminescent sheet that faces the first end of said housing is at least partially transparent and uniformly diffuse to permit light emitted by said photoluminescent sheet to illuminate the plurality of charge coupled devices.

3. An illumination apparatus according to claim 2 wherein said pair of support sheets comprises a pair of plexiglass sheets.

4. An illumination apparatus according to claim 2 wherein said housing is cup-shaped, and wherein said photoluminescent sheet assembly is disposed adjacent the first end of said housing.

5. An illumination apparatus according to claim 1 further comprising a mounting ring, operably connected to the first end of said housing, for mounting said housing to the detector such that the first end of said housing opens toward the detector.

6. A portable apparatus for uniformly illuminating a detector comprised of a plurality of charge coupled devices during calibration of the respective gains of the charge coupled devices, the portable illumination apparatus comprising:
    a housing defining an internal cavity and opening through a first end;
    a mounting ring, operably connected to the first end of said housing, for mounting said housing to the detector such that said housing opens toward the detector; and
    a light source disposed within the internal cavity of said housing for uniformly illuminating the plurality of charge coupled devices to thereby permit the respective gains of the charge coupled devices to be calibrated.

7. A portable illumination apparatus according to claim 6 wherein said light source comprises a photoluminescent sheet.

8. A portable illumination apparatus according to claim 7 further comprising a photoluminescent sheet assembly comprising said photoluminescent sheet and a pair of support sheets disposed on opposite sides of said photoluminescent sheet, wherein said support sheet disposed on the side of said photoluminescent sheet that faces the first end of said housing is at least partially transparent and uniformly diffuse to permit light emitted by said photoluminescent sheet to illuminate the plurality of charge coupled devices.

9. A portable illumination apparatus according to claim 8 wherein said pair of support sheets comprises a pair of plexiglass sheets.

10. A portable illumination apparatus according to claim 8 wherein said housing is cup-shaped, and wherein said photoluminescent sheet assembly disposed adjacent the first end of said housing.

11. A portable apparatus for uniformly illuminating a detector comprised of a plurality of charge coupled devices during calibration of the respective gains of the charge coupled devices, the portable illumination apparatus comprising:
    a cup-shaped housing defining an internal cavity and opening through a first end, said cup-shaped housing adapted to mount to the detector such that said cup-shaped housing opens toward the detector; and a light source disposed within the internal cavity defined by said cup-shaped housing for uniformly illuminating the plurality of charge coupled devices to thereby permit the respective gains of the charge coupled devices to be calibrated.

12. A portable illumination apparatus according to claim 11 wherein said light source comprises a photoluminescent sheet.

13. A portable illumination apparatus according to claim 12 further comprising a photoluminescent sheet assembly comprising said photoluminescent sheet and a pair of support sheets disposed on opposite sides of said photoluminescent sheet, wherein said support sheet disposed on the side of said photoluminescent sheet that faces the first end of said cup-shaped housing is at least partially transparent and uniformly diffuse to permit light emitted by said photoluminescent sheet to illuminate the plurality of charge coupled devices.

14. A portable illumination apparatus according to claim 13 wherein said pair of support sheets comprises a pair of plexiglass sheets.

15. A portable illumination apparatus according to claim 13 wherein said photoluminescent sheet assembly is disposed adjacent the first end of said housing.

16. A portable illumination apparatus according to claim 11 further comprising a mounting ring, operably connected to the first end of said housing, for mounting said housing to the detector such that the first end of said housing opens toward the detector.

* * * * *